Figure 1:
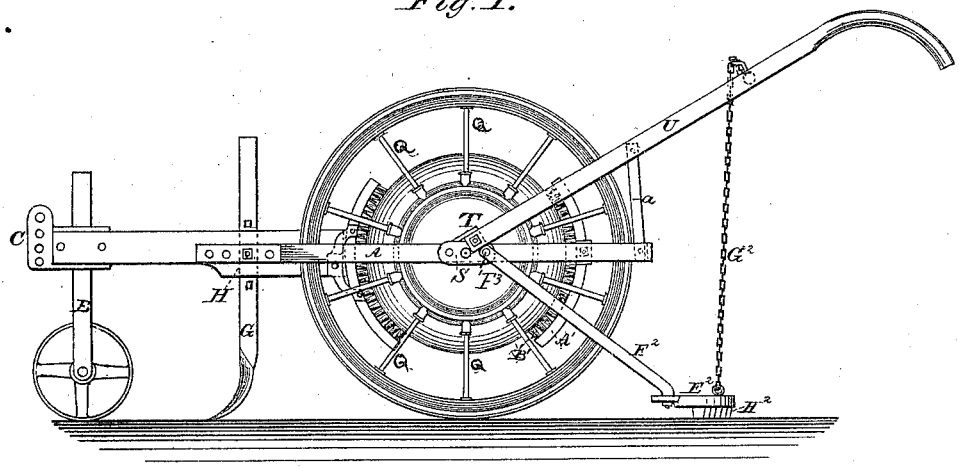

2 Sheets--Sheet 1.

E. P. JONES.
Seed-Planters and Fertilizer Distributors.

No. 140,046.                Patented June 17, 1873.

Witnesses:
Wm J. Peyton
Albert H. Norrie

Inventor:
E. P. Jones
By James L. Norris
atty.

AM. PHOTO-LITHOGRAPHIC CO. N.Y. (OSBORNE'S PROCESS.)

2 Sheets--Sheet 2.
E. P. JONES.
Seed-Planters and Fertilizer Distributors.
No. 140,046. Patented June 17, 1873.
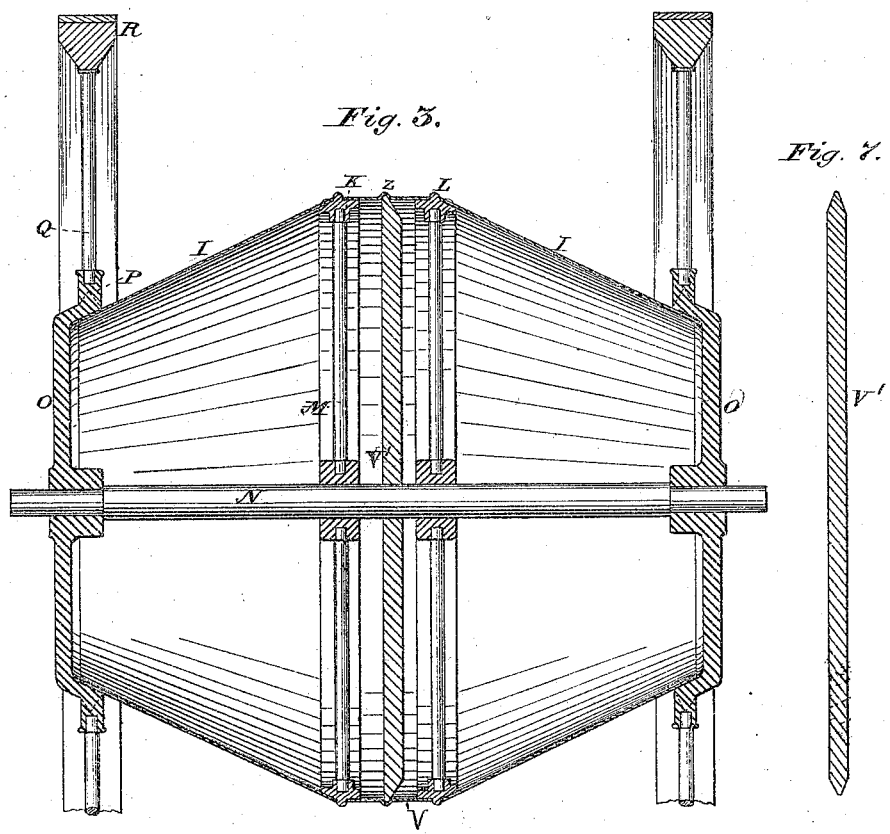
Fig. 3.
Fig. 7.
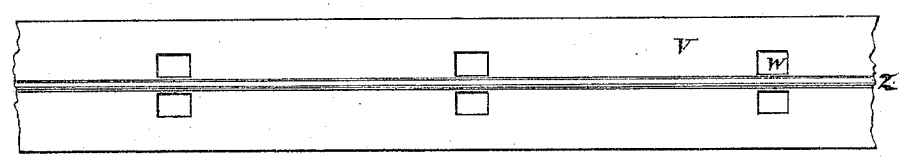
Fig. 4.
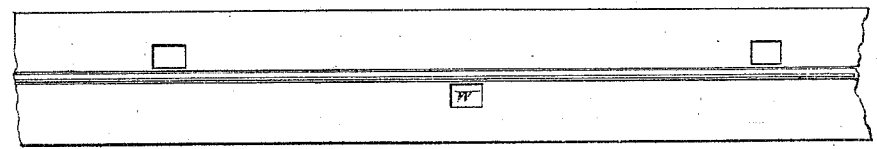
Fig. 5.
Fig. 6.
Witnesses: Wm. J. Peyton. Albert H. Norris.
Inventor: E. P. Jones. By J. L. Norris, atty.
AM. PHOTO-LITHOGRAPHIC CO. N.Y. (OSBORNE'S PROCESS.)

UNITED STATES PATENT OFFICE.

EZEKIEL P. JONES, OF GREENSBOROUGH, NORTH CAROLINA.

IMPROVEMENT IN SEED-PLANTERS AND FERTILIZER-DISTRIBUTERS.

Specification forming part of Letters Patent No. 140,046, dated June 17, 1873; application filed March 22, 1873.

*To all whom it may concern:*

Be it known that I, EZEKIEL P. JONES, of Greensborough, in the county of Guilford and State of North Carolina, have invented certain new and useful Improvements in Seed-Planter and Fertilizer-Distributer, of which the following is a specification:

This invention has for its object to furnish a machine adapted for planting seeds of various kinds and pulverulent fertilizers, which shall be simple, strong, durable in its construction, neat and compact in its appearance, adapted to be managed with ease and facility, and to be readily adjusted, as desired, and performing the work in a very superior manner and with the greatest possible regularity and precision. The invention consists, primarily, in the provision of a revolving seed-drum, composed of two frustums of cones, the bases of which are attached to centrally-located annular rims, serving, in connection with a series of internal supporting-spokes on the axle upon which the drum is mounted, to impart the desired strength or stability to the same. The invention also consists in the arrangement, within the drum, of a central partition for dividing the seed-drum into two lateral compartments adapted for the reception and distribution of two kinds of seed, or pulverulent fertilizers and seed, the discharge taking place through a series of orifices formed in a changeable hoop or band surrounding the seed-drum, and disposed on both sides of the partition, for alternately discharging cotton-seed and fertilizing materials, or two kinds of seed, simultaneously, when so desired. The invention also consists in the relative arrangement, with the central partition of the seed-drum or holder, of two semicircular or segmental shields, carrying brushes which serve to remove all earth adhering to the periphery of the drum, said shields being, however, chiefly desired to prevent the premature or irregular discharge of the seed, which would, by reason of the commotion of the seed when the drum is revolved, be an unavoidable result, unless provision were made to effect the delivery of the seed at certain intervals, or when the discharge-openings are at the proper point of delivery. The invention further consists in applying to the shells constituting the seed-drum detachable heads or disks, to which the spokes of the ground or driving wheels are directly applied, thus dispensing with the use of separate hubs for said wheels.

Figure 2:
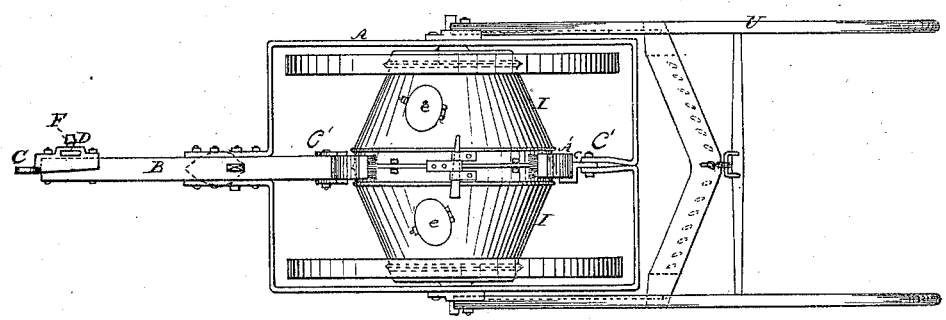

In the drawings, Figure 1 is a side elevation of a planter embodying my invention. Fig. 2 is a top or plan view of the same. Fig. 3 is a transverse sectional view of the revolving seed-drum. Figs. 4, 5, and 6 are detached views of perforated hoops to be applied to the seed-drum for planting different kinds of seed. Fig. 7 is a view of the division-plate.

The frame A, carrying the entire planting mechanism, is, by preference, for the sake of strength and lightness, constructed of metal, and has attached to its forward end a beam, B, provided with a clevis, C, for the application of the draft, said clevis being extended laterally to embrace the beam, and provided with a socket, D, for the reception of the shank or standard of a gage-wheel, E. Said standard is susceptible of being readily adjusted vertically, and of being retained at any desired elevation for regulating the depth of penetration of the furrowing device by means of thumb-screws or their equivalent. In rear of the gage-wheel is arranged a plow, G, which passes through the beam, to which it is adjustably secured by a transverse screw or bolt, H, for enabling the depth of the furrow or trench formed by said plow to be regulated at will. Situated within the frame A is a revolving seed drum or holder, which is composed of two sectional metallic shells or frustums of cones, I, the bases of which are attached to annular rims K L of solid metal by means of rivets or otherwise, said rims serving, in connection with a series of internal spokes, M, attached to an axle, N, upon which the drum is mounted, to impart the necessary rigidity or strength to the seed-drum, for preventing the collapse of the same when subjected to pressure. To the ends of the drum are applied massive disks O O, constituting the heads of the drum, and provided also with sockets P for the reception of a series of spokes, Q, which are attached to a felly, R, such an arrangement of parts having for its object to dispense with separate hubs for the traction or ground weeels employed for effecting the rotation of the seed-drum at the proper distance above the ground. The axle N of the wheels and drum passes through the side bars of the frame, and is journaled in separate or detachable castings or brackets S, which are formed with seats T for the reception of the lower ends of the guide-handles U, which are supported in a suitable manner by brace-rods *a a*. Openings, closed by doors *e e*, and suitable buttons or latches, are made in the seed-drum for the insertion of the seed, &c. To the central portion of the seed-drum, immediately over the continuous opening formed between the adjacent edges of the sections comprising said drum, is applied a circumferential hoop or band, V, which, when the machine is designed for planting a single kind of seed, is provided with a series of openings, W, of the proper form or size to suit either cotton, corn, peas, turnip, or any other seed or fertilizers, or for planting fertilizers and seed at the same time, together or alternately. Said perforated hoop is formed with disconnected ends, so that the same can be readily applied to the drum and be retained in position by a projecting tongue on one end entering a slot in the opposite end of the hoop, the fastening being completed by the insertion of a wedge or key, X, through the looped ends of said hoop, or in any other desired manner.

Such a construction of parts will permit the interchangeable use of hoops provided with different-shaped openings, according to the size or kind of seed to be planted, which enhances the capability of my machine.

Provision is made for planting two kinds of seed simultaneously or on the same hill or ridge by inserting within the seed-drum a sectional partition, V', Figs. 3 and 7, embracing the axle N and having its periphery inserted into a continuous groove or corrugation, Z, formed in a hoop particularly adapted for use in this instance. The partition, arranged as shown, will divide the seed-drum into two lateral compartments, adapted for the reception of two kinds of seed, or seed and pulverulent fertilizers, and the proper distribution of the seed is effected by forming the hoop with a double series of perforations, arranged on opposite sides of the partition, and either set in a staggered line or to the right and left of each other for alternately planting seed and fertilizers, which, in certain instances, is desirable.

To prevent the seed escaping at any but the desired point, so as to insure the formation of hills at regular intervals apart, I apply to the front and rear portions of the main frame two segmental or curved shields, A', to the internal surface of which is attached a series of bristles or brushes, B', which serve to remove all the earth accumulating or adhering to the seed-drum. Said shields, arranged as shown, will prevent the premature or irregular discharge of the seed through the openings in the hoop above the discharge-point, which is immediately below the axle of the seed-drum and between the lower ends of the curved shields.

The arms or brackets C' carrying shields are generally slotted for the passage of a fastening-bolt, so as to enable the same to be retracted when seeds are being planted which have not the tendency to pass through the perforations when above the discharge-point.

The seed is delivered into the furrow opened by the plow in advance of the drum, and the covering of the seed is effected by a drag-bar, $E^2$, which is attached to swinging frame $F^2$, hung on fulcrum-pins $F^3$ on the brackets supporting the handles, and provided with a chain, $G^2$, passing through an eye in the handle-connecting bar for elevating and depressing the drag with ease and despatch.

The drag-bar is made curved or converging, and has applied to its lower surface a series of harrow-teeth, $H^2$, which effect the thorough pulverization of the soil, while the drag-bar, by reason of its peculiar shape, will tend to throw the earth up in hills or ridges.

Having thus fully described my invention, what I claim as new, and desire to secure by Letters Patent, is—

1. A revolving seed-holder or distributing-drum, composed of two sections or shells attached to annular supporting rims and spokes, as and for the purpose specified.

2. A revolving seed-holder provided with a detachable partition, V', dividing the drum into two compartments, substantially as described, for the purpose set forth.

3. The segmental brushes B' B', arranged on the shields A' A' and brackets C' C' for operating in connection with a belt interposed between the two sections of the cone-cylinder I, substantially as and for the purpose specified.

4. The seed-drum, provided with solid heads, combined with the spokes and fellies of the traction-wheels, as and for the purpose specified.

In testimony that I claim the foregoing I have hereunto set my hand this 5th day of March, 1873.

EZEKIEL P. JONES.

Witnesses:
WILLIAM J. PEYTON,
ALBERT H. NORRIS.